July 14, 1931. F. M. RUTTEN 1,814,412
SEALING DEVICE
Filed July 8, 1929
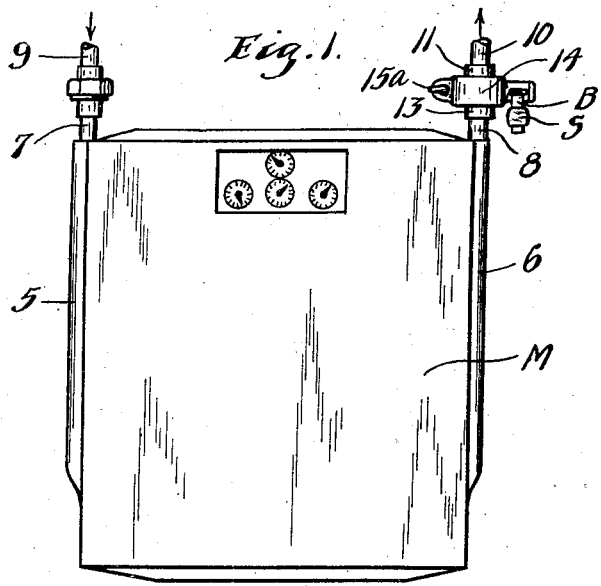
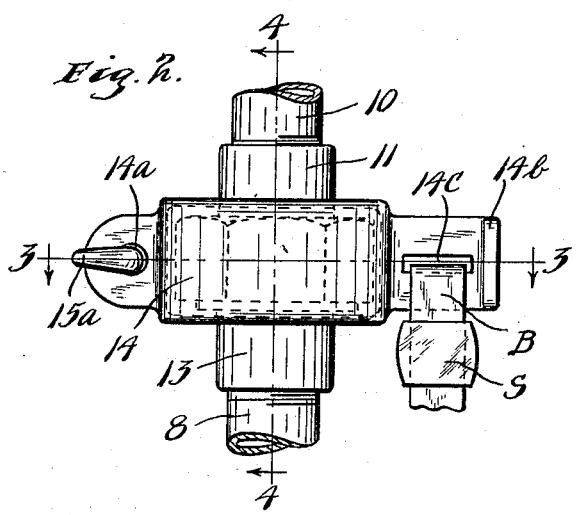
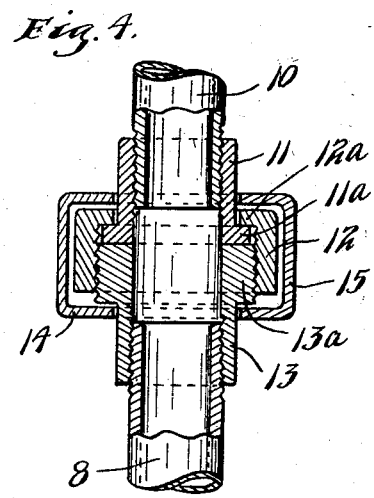
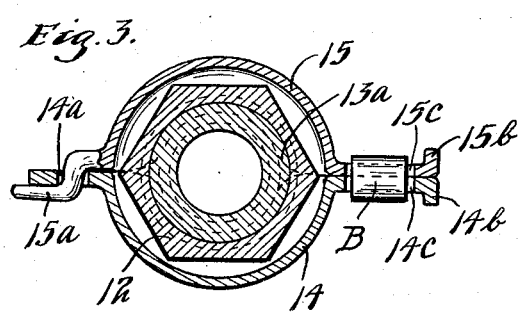
INVENTOR.
FRANK M. RUTTEN.
BY HIS ATTORNEYS Patented July 14, 1931

1,814,412

UNITED STATES PATENT OFFICE

FRANK M. RUTTEN, OF SIOUX CITY, IOWA, ASSIGNOR, BY DIRECT AND MESNE ASSIGNMENTS, OF TEN PER CENT TO GOLTZ & BROWN, A FIRM CONSISTING OF CARLOS W. GOLTZ AND BERNARD A. BROWN, AND TEN PER CENT TO EDWIN M. BROWN

SEALING DEVICE

Application filed July 8, 1929. Serial No. 376,637.

This invention relates to protective sealing devices for couplings, unions, nuts and the like and especially to sealing devices for the couplings or unions employed to connect gas and water meters with their respective supply pipes.

Utility companies have experienced large losses due to the theft of gas and water. In many instances the couplings between the meters and the gas and water pipes have been loosened by unscrupulous patrons and the fluid has been diverted and consumed. In the form of gas meter extensively employed at this time by most of the large gas companies a valve is located in the discharge passage of the meter and may be manipulated by inserting a wire or rod through the meter discharge pipe to cause gas within the meter to be diverted from the motor of the meter, thereby enabling the thief to consume large amounts of the fluid without paying for the same. This is usually accomplished by releasing the coupling nut to expose the end of the short pipe connected with the discharge of the meter, then inserting a wire rod downwardly through said pipe until it opens said valve and then replacing the coupling.

It is an object of my invention to provide an extremely simple but efficient sealing device for couplings, unions and nuts in supply pipes for meters, especially adapted to obviate the theft of gas and water above set forth.

It is a further object to provide a protective sealing device constituting an enclosure for a coupling and a nut and held in place by a suitable sealing member whereby the nut or coupling cannot be loosened without breaking the seal.

More specifically it is an object to provide a sealing device for nuts and couplings comprising a pair of cooperating shell members adapted to loosely surround a coupling member or nut and held in operative position by a sealing element of conventional type.

These and other objects and advantages of the invention will be apparent from the following description made in connection with the accompanying drawings wherein like reference characters refer to similar parts throughout the several views and in which, Fig. 1 is a front elevation of a conventional type of gas meter with an embodiment of my invention applied to the discharge coupling of the meter;

Fig. 2 is a front elevation on a larger scale of my sealing device applied to said coupling;

Fig. 3 is a cross section taken on the line 3—3 of Fig. 2; and

Fig. 4 is a longitudinal section taken on the line 4—4 of Fig. 2.

In Fig. 1 a conventional gas meter M is illustrated having the usual vertical intake passage 5 at the left side thereof and the outlet passage 6 at the right side thereof. A short intake pipe 7 projects above the top of meter M connected with intake passage 5 and a similar outlet pipe 8 is connected with the outlet passage 6. Gas pipes 9 and 10 are connected with the intake and return pipes 7 and 8 respectively of the meter by couplings or unions of standard type and as clearly illustrated in Fig. 4, each of said couplings comprises a flanged sleeve 11 threadedly secured to the lower end of one of the gas pipes usually having a ground lower edge on the widened or flanged portion. The flange 11a of said sleeve projects laterally outwardly from the lower end thereof and swivelly secures to said sleeve a coupling nut 12 having an inturned annular flange 12a at its upper end. The upper end of the meter pipe to be joined is provided with the usual sleeve 13 threadedly secured thereto, said sleeve carrying an enlarged head 13a which is externally threaded for engagement with the coupling nut 12. The end of head 13a is preferably ground to engage the ground edge of the flange 11a of sleeve 11 affording a ground joint between the coupling members.

The preferred embodiment of my sealing device comprises a pair of cooperating shell members designated as entireties by the numerals 14 and 15 respectively, as shown, said shell members being of general semi-circular shape and having projecting portions at their rear ends affording a lock hinge between said members and having projecting straps or plates 14b and 15b respectively at their opposite ends adapted to receive a suitable sealing member. As shown, shell member 15 is provided with a hook or offset tongue 15a adapted to be inserted through an eye 14a of the rearwardly projecting portion of shell member 14 to afford a lock hinge between said shell members. Shell members 14 and 15, as clearly shown in Fig. 4, are of U-shape cross section and are adapted to surround and completely enclose the coupling nut 12. Straps or plates 14b and 15b abut when the cooperating shell members are closed about the coupling nut and a seal of any suitable type is applied to said straps. If desired, registering slots 14c and 15c may be formed in said straps or plates and a conventional sealing band B may be inserted through said slots, the ends of said band being clinched or otherwise secured by a slotted seal S.

To apply my sealing device to a nut or coupling member, the cooperating shells 14 and 15 are hinged together by inserting offset tongue 15a into the eye 14a. The shells are then fitted about the nut and swung together at their free ends and the sealing member applied to the abutting straps or plates 14b and 15b. When so applied, the nut or coupling member cannot be turned or loosened until the shell members 14 and 15 are removed therefrom and to remove said members the sealing band B or other sealing element must be broken which, of course, can be readily detected by the meter inspector.

It will also be noticed that the inwardly extending flanges of shell members 14 and 15 surround the coupling sleeves 11 and 13 and are adapted to abut the shoulders provided by the enlarged head 13a of sleeve 13 and the coupling nut 12. Thus shell members 14 and 15 cannot be withdrawn from the coupling without breaking the seal even though the coupling nut 12 could be loosened, the lower flanges of said shell members underlying the head 13a and the upper flanges overlying the inturned flanges 12a of the coupling nut 12.

In the foregoing description, it will be seen that I have provided a very simple but highly efficient sealing device, which is especially applicable to couplings, unions and nuts. The device may be manufactured at low cost and can be quickly and easily applied to seal standard couplings in extensive use at this time.

It will, of course, be understood that various changes may be made in the form, details, arrangement and proportions of the various parts without departing from the scope of the present invention.

What is claimed is:—

A sealing device for couplings and nuts comprising a pair of independent semi-circular shell members of U-shape in cross section, each having a pair of spaced semi-circular flanges, the edge of one of which is adapted to over-lap the shoulder of an enlarged head, constituting a part of a pipe coupling and the other of which is adapted to over-lap the outer end of the rotary nut of a coupling, said shells having cooperating lock hinge elements at corresponding ends thereof and having abutting projections at the opposite ends thereof, a sealing element engaging said abutting projections to retain said shells in locked position, and said lock hinge elements comprising a plate or ear on one of said shell members lying substantially in a common plane with the abutting projection of said member and having a lateral aperture therein, said second shell member having at the corresponding end a projecting tongue having an angular offset extremity interlocked with the apertured portion of said ear.

In testimony whereof I affix my signature.

FRANK M. RUTTEN.